United States Patent [19]
Franceschi

[11] 3,935,877
[45] Feb. 3, 1976

[54] TAMPER-PROOF LOCKING SYSTEM FOR FIRE HYDRANTS

[76] Inventor: Peter A. Franceschi, 552 Van Ness Ave., Bronx, N.Y. 10460

[22] Filed: July 23, 1974

[21] Appl. No.: 491,470

[52] U.S. Cl. ............... 137/296; 81/170; 85/9 R; 85/45; 137/382; 220/284; 251/291
[51] Int. Cl.² ............................... F16K 35/06
[58] Field of Search ........ 137/382, 382.5, 294, 296; 85/9 R, 45; 251/291, 292; 220/284; 81/170

[56] References Cited
UNITED STATES PATENTS

| | | | |
|---|---|---|---|
| 624,628 | 5/1899 | Corey | 251/292 |
| 2,287,725 | 6/1942 | Conte | 403/379 X |
| 3,070,115 | 12/1962 | Jester | 137/296 |
| 3,709,249 | 1/1973 | Diaz | 137/296 |
| 3,718,350 | 2/1973 | Klein | 285/39 |

Primary Examiner—Irwin C. Cohen
Assistant Examiner—Richard Gerard

[57] ABSTRACT

A tamper-proof locking system for a standard fire hydrant, one embodiment of which includes a cap assembly that fits over the valve stem of the hydrant and is fastened thereto. The cap assembly cannot be turned to open the valve except by means of a special wrench which is adjustable to securely grip the assembly. In another embodiment, the system includes a cover assembly which replaces a standard hydrant port cover and cannot be taken off the nipple of the port except by the special wrench.

8 Claims, 9 Drawing Figures

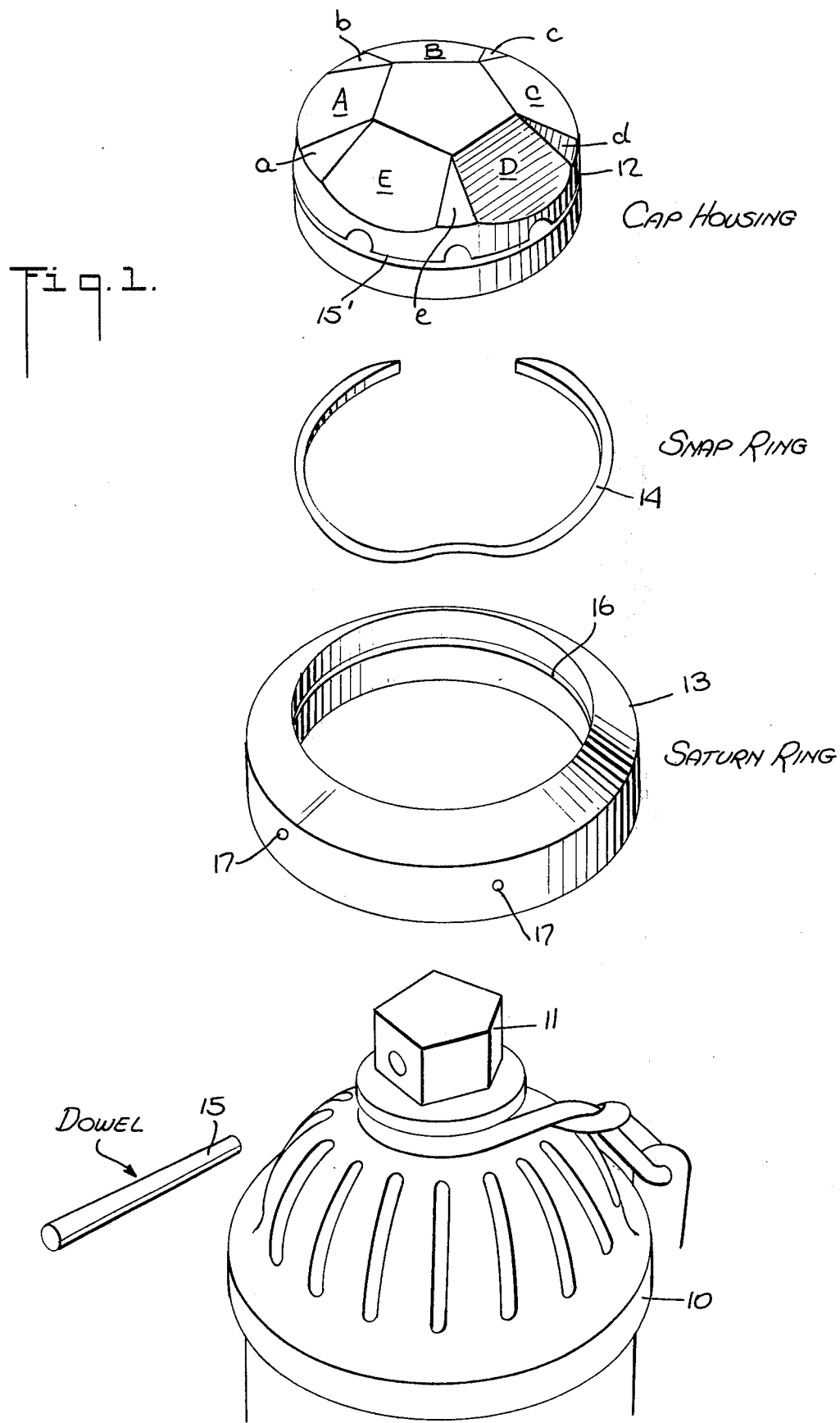

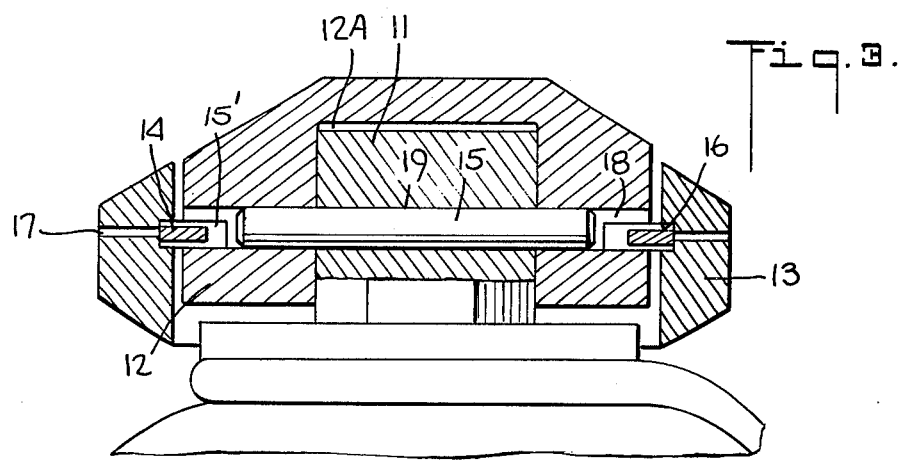
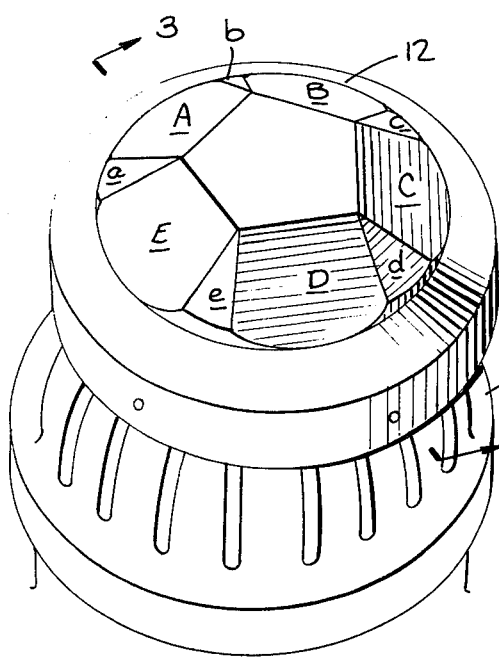
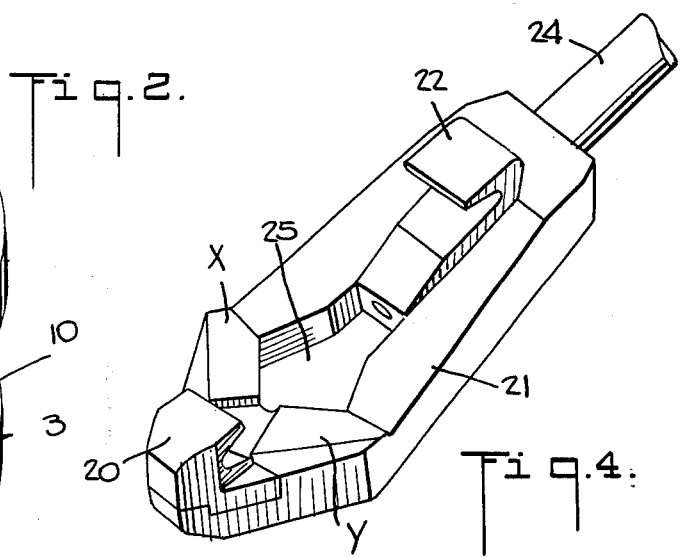
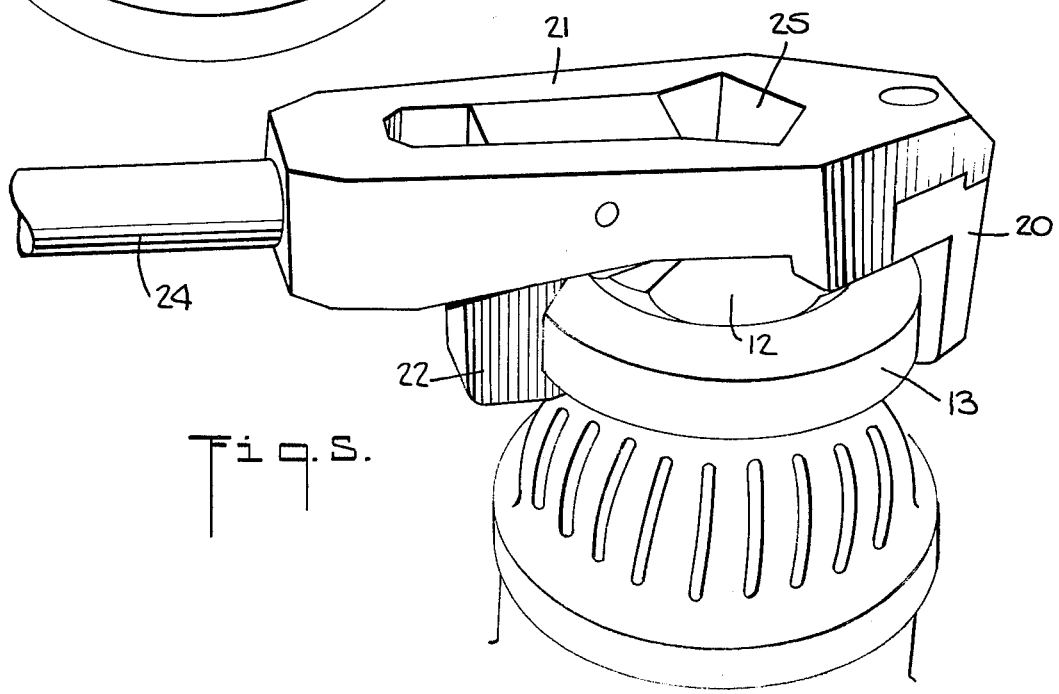

TAMPER-PROOF LOCKING SYSTEM FOR FIRE HYDRANTS

BACKGROUND OF THE INVENTION

This invention relates generally to protective locks for valves and other devices which are operated by means of wrenches, and more particularly to a tamper-proof locking system for a standard fire hydrant which precludes unauthorized use of the hydrant.

A hydrant is a connection incorporated in a water main to enable a hose to be attached and a continuous supply of water to be obtained for the purpose of extinguishing fires or washing down streets. The typical hydrant or fire plug is constituted by a discharge pipe coupled to the water main and provided with a spout and a control valve. The valve has an operating stem, usually in pentagonal form. To open the valve, the stem is engaged and turned by means of a standard wrench adapted to engage the same. Similar valves are often found on the sides of buildings to operate sprinkler systems installed in the hallways.

A very common and serious problem encountered in large municipalities having thousands of fire hydrants dispersed throughout the city is the unauthorized operation of the hydrants. The public has ready access to the hydrants, and it is a simple matter to open the valves, for all that is required is an ordinary wrench adapted to engage and turn the valve stem.

Such unauthorized use may be well-motivated, as when a hydrant is operated to create a play shower in the street on a hot summer day. But when this happens on a large scale throughout the city, the resultant drop in water pressure may have serious consequences should a fire break out. In other instances, the unauthorized use of the fire hydrant may be malicious or an act of sabotage, but whatever the intention, the fact remains that the loss in water pressure may create a hazardous condition.

Various attempts have heretofore been made to provide tamper-proof locks for fire hydrants which cannot be operated by standard wrenches. Among the various approaches to this problem are the arrangements disclosed in the Diaz U.S. Pat. No. 3,709,249, the Mihalich U.S. Pat. No. 3,456,463, the Adinolfi U.S. Pat. No. 3,453,897, the Smith U.S. Pat. No. 3,532,109, the Jester U.S. Pat. No. 3,070,115, the Sullivan U.S. Pat. No. 3,532,108 and the Quinones U.S. Pat. No. 3,626,961.

One problem with prior art locking arrangements is that in some instances a special type of hydrant is required so that it is not possible to apply the locking device to existing hydrants. The cost of manufacturing and installing special hydrants on a large scale is prohibitive. In other instances, the locking device is designed for a standard hydrant but because of its complexity, it is costly to make and difficult to operate. It must be borne in mind that when the need arises for water to quench a fire, time is of the essence and firefighting personnel must be in a position to operate the fire hydrant quickly and without difficulty.

SUMMARY OF THE INVENTION

In view of the foregoing, it is the main object of this invention to provide a lock system which is designed to withstand major abuse and tampering and which may be readily installed on a standard hydrant to prevent unauthorized operation thereof.

More particularly, it is an object of this invention to provide a system of the above-type constituted by a cap assembly which is readily fastened onto the stem of any existing hydrant or equivalent apparatus, the cap assembly precluding stem rotation by any conventional wrench or other tool other than a cap wrench specially adapted to engage the assembly.

Still another object of this invention is to provide a cover assembly which is designed to replace the existing cover on a hydrant post, the cover assembly being removable only by means of a special wrench.

Yet another object of the invention is to provide a low-cost, efficient and reliable tamper-proof lock system which is made up of a rugged group of components that are easily mounted within a matter of minutes on existing hardware.

Briefly stated, in one embodiment of the invention, these objects are attained in a system constituted by a cap assembly and a cooperating wrench, the assembly including a cap housing having an exposed array of sloped faces and an inner cavity dimensioned to receive and socket the stem of a standard hydrant whereby rotation of said housing causes rotation of said stem. The wrench is provided with at least two faces adapted to complement and engage corresponding faces in the array thereof on said cap housing, the wrench being adjustable to grip the cap housing whereby the wrench may be used to turn the housing and thereby turn the stem.

In another embodiment of the invention, the system is constituted by a cover assembly and a cooperating wrench, the assembly including a cover housing having an exposed array of sloped faces and an inner cavity dimensioned to be received on the nipple of a hydrant port, whereby by rotation of the housing, the housing may be removed from the nipple, such rotation being possible only by means of said wrench.

OUTLINE OF THE DRAWINGS

For a better understanding of the invention as well as other objects and further features thereof, reference is made to the following detailed description to be read in conjunction with the accompanying drawing, wherein:

FIG. 1 is an exploded view of the components of a first embodiment of a tamper-proof locking assembly in accordance with the invention;

FIG. 2 is a perspective view of the assembly installed on a standard fire hydrant;

FIG. 3 is a section taken in the plane indicated by line 3—3 in FIG. 2;

FIG. 4 is a perspective view of the underside of a special wrench adopted to engage the locking assembly;

FIG. 5 is a perspective view of the wrench in engagement with the assembly;

DESCRIPTION OF THE INVENTION

First Embodiment

Figure 6:
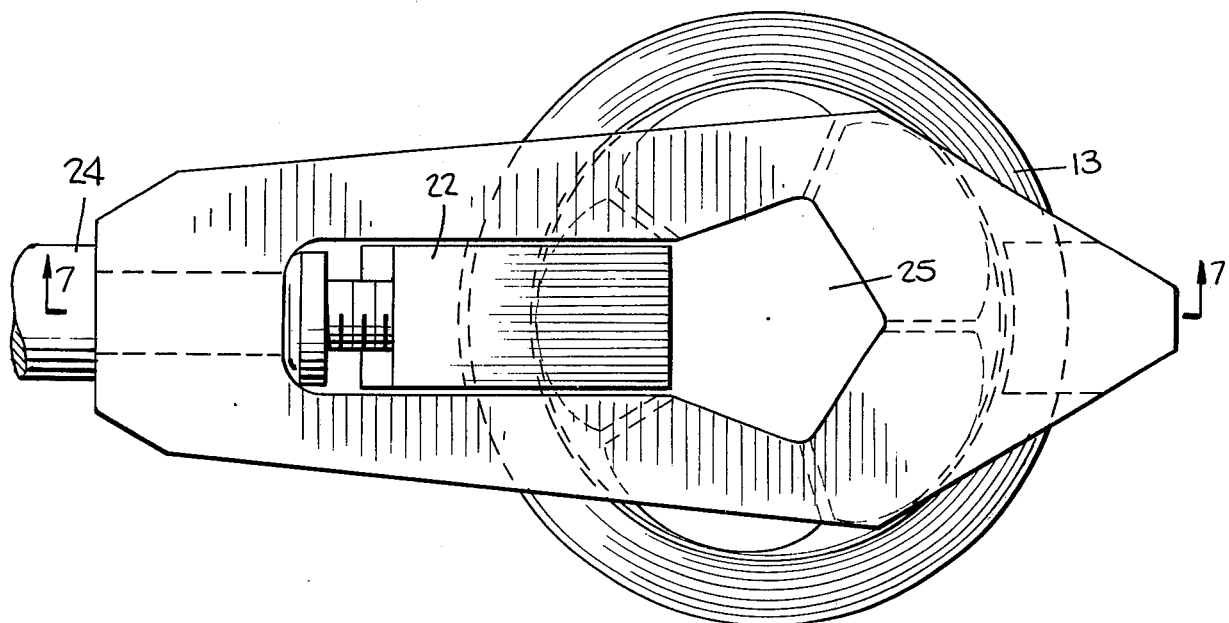
FIG. 6 is a plan view of the wrench in engagement with the assembly.

A lock system in accordance with one embodiment of the invention is constituted by a cap assembly and a cooperating cap wrench. The cap assembly, as shown in FIGS. 1 and 2, is adapted to be installed on a standard fire hydrant 10 whose valve is provided with an exposed operating stem 11 having a pentagonal form. The cap assembly consists of four components: a cap housing 12, a Saturn ring 13, a split snap ring 14 and a dowel pin 15.

The cap assembly in an adapter which may be fastened to an existing fire hydrant stem, precluding its rotation by anything other than a cap wrench specially adapted to engage the assembly. The cap assembly cannot be operated by an ordinary wrench of the type used to engage the stem or by any other conventional tool.

The exposed head of cap housing 12 has a sloped, generally pentagonal male formation having five major faces A, B, C, D and E. The junctions of these faces are bevelled to define minor faces a, b, c, d, and e. The interior cavity 12A of the housing acts as a female socket to mate with stem 11 of the valve, and it therefore has a complementary pentagonal formation. It will be appreciated that the invention is not limited to this formation and that any other suitable multifaceted shape may be used. In a practical embodiment, the cap housing is made of extremely hard surface steel having a 3-inch diameter, the housing being 1 inch thick.

As shown in FIG. 3, cap housing 12 is provided with a peripheral groove 15' which accepts snap ring 14, the ring being preferably made of a hardened spring steel. Also provided is a transverse diagonal bore 18 which passes through groove 15' and is dimensioned to receive dowel pin 15. Snap ring 14 is received within a circular groove 16 on the inner periphery of Saturn ring 13 at a position corresponding to that of the groove 15' on the cap housing, so that the snap ring is shared by and positions the Saturn ring. The Saturn ring is preferably of hardened steel, and is provided with six equi-spaced radial holes 17 intersecting inner groove 16.

When mounting the cap assembly, the first step is to place cap housing 12 over fire hydrant stem 11. Using transverse hole 18 in the cap housing as a guide, a hole 19 of the same diameter is drilled through hydrant stem 11. This is the only modification necessary in the standard fire hydrant to adapt it to accept the cap assembly. The dowel pin 15 is then pressed into stem hole 19 and is symmetrically positioned therein so that its ends project into transverse hole 18 in the cap housing thereby securing the housing to the stem. The Saturn ring 13, with snap ring 14 preinstalled in inner groove 16, is then placed over cap housing 12 and pushed downward, this action expanding the split snap ring until it snaps into place in the mating groove 15' in the cap housing.

Should it be desired to thereafter remove the cap assembly from the hydrant, this may be done by means of a dismantling ring (not shown) which is dimensioned to fit concentrically over the Saturn ring. The dismantling ring is provided with six equi-spaced radially-mounted screws which are aligned with the six radial holes 17 in Saturn ring 13.

By tightening these screws so that they move inwardly to engage the snap ring, the snap ring is thereby compressed until it is retracted from groove 16 in the Saturn ring whereby the Saturn ring may then be withdrawn. With the Saturn ring removed, the snap ring is now free to expand, and thereby disengage itself from the groove 15' in the cap housing 12. The dowel pin 15 is now accessible and can be driven out, freeing the cap housing for removal from the fire hydrant stem.

The cap wrench, as shown in FIGS. 4 to 7, is adapted to cooperate with the cap assembly and is essentially a claw-shaped member preferably fabricated of tough, hardened steel. The wrench includes a fixed claw piece 20 at the end of a bifurcated frame 21 having a pair of faces X and Y, formed thereon which are sloped and shaped to complement and engage any two of the major faces (A to E) of the cap housing.

Shiftable within the arms of the bifurcated frame 21 is a movable claw piece 22 provided with a threaded bore which receives a threaded rod 23 extending from the inner end of a handle 24. Upon rotation of the handle, movable claw piece 22 moves towards or away from fixed claw piece 20, depending on the direction of rotation. The wrench frame is also provided with a pentagonally shaped hole 25 so that the wrench may, if necessary, be applied to a standard fire hydrant stem which does not have a cap assembly fastened thereto.

Figure 7:
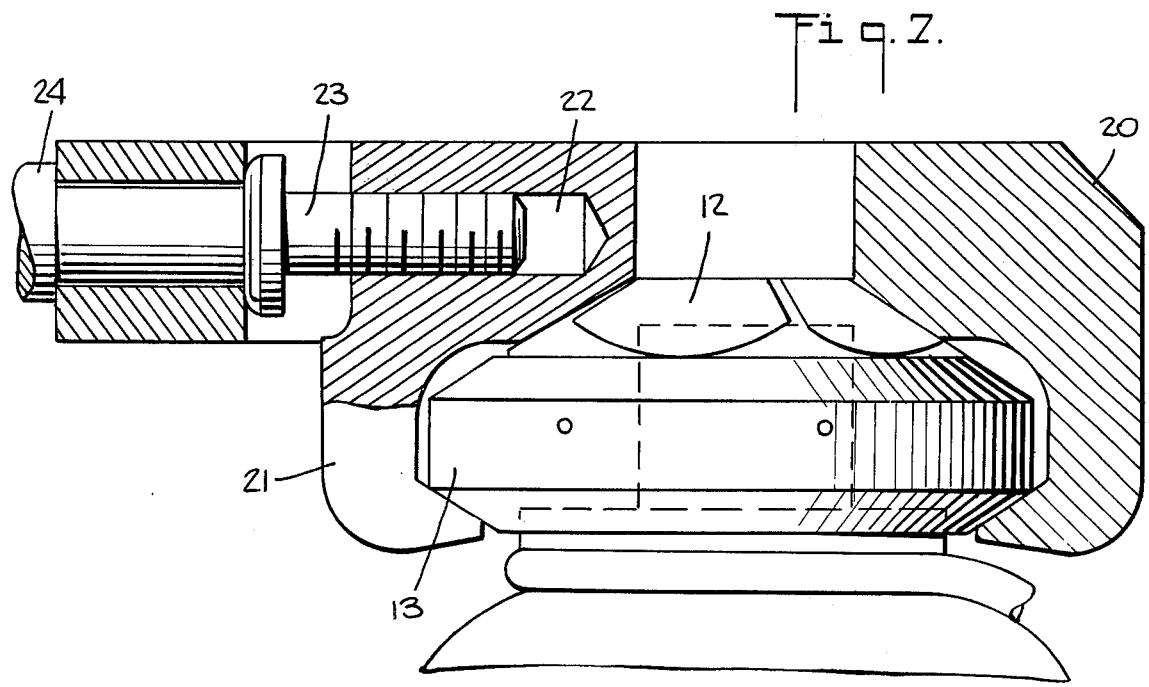
FIG. 7 is a section taken in the plane indicated by lines 7—7 in FIG. 6.

The wrench, as will be evident in FIGS. 5 and 7, is fashioned to grip the underside of the Saturn ring, thereby to gain purchase and to engage two faces of the sloped pentagonal head of the cap housing. The wrench is adjustable to take up all clearances and to lock securely onto the cap assembly.

While the system is disclosed as it operates in conjunction with the valve stem of a fire hydrant, it is to be noted that the two spouts of the standard hydrant are provided with removable covers having stem-like extensions to facilitate removal of the covers by means of a standard wrench. Hence the typical hydrant has three stems, all of which are in need of protection.

The reason why the spout covers of the hydrant must be guarded against unauthorized removal is that it is not uncommon to find that foreign matter has been illicitly lodged in the spouts. This material may do damage to the associated fire engine pump system.

Second Embodiment

In the arrangement illustrated in FIGS. 1 to 7, the cap assembly is adapted to cooperate with the pentagonal stem on the fire hydrant valve, the cap assembly being attached to the stem such that when the assembly is turned by the special wrench the stem is also caused to turn to open the valve.

The same cap assembly may be used in conjunction with the stem-like extension on the cover of the fire hydrant spout or port which cover is threadably received on the nipple of the port, so that when the assembly is turned by the special wrench the cover and the assembly attached thereto may be removed from the nipple and replaced by the fireman's hose.

Figure 9:
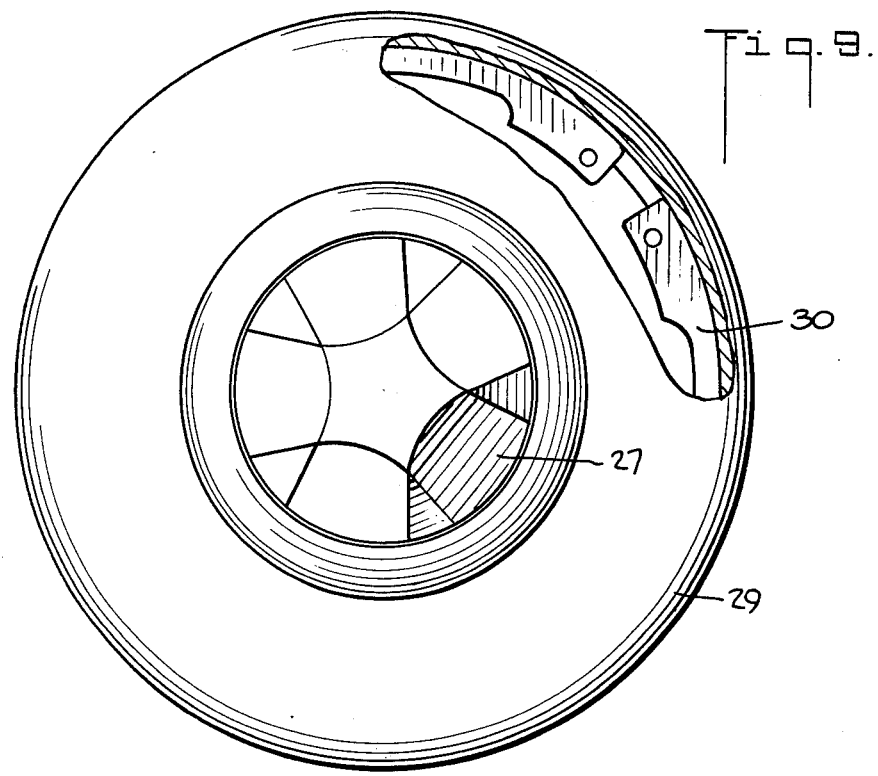
FIG. 9 is a plan view of said second embodiment.
Figure 8:
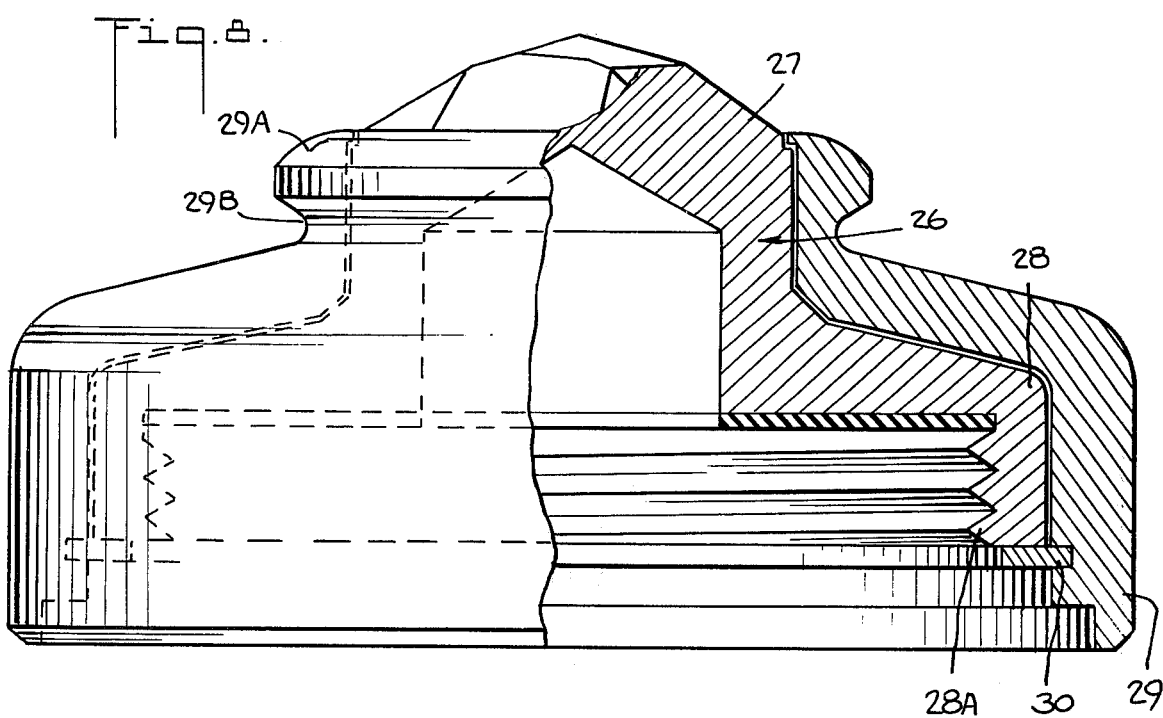
FIG. 8 is an elevational view, partly in section of a second embodiment of a locking assembly in accordance with the invention.

An alternative approach is shown in FIGS. 8 and 9 where the cover assembly operates on essentially the same principles as the cap assembly and also requires the same special wrench to turn, but differs from the cap assembly to the extent that it does not cooperate with a stem but serves to supplant the existing port cover. Hence the cover assembly itself functions as the cover to close off the port and one must remove the cover assembly from the port nipple with the special wrench before attaching a hose thereto.

The cover assembly includes a cover housing 26 whose function is generally similar to that of the conventional port cover it replaces on the hydrant, the housing having a multifaceted exposed head 27 having a generally pentagonal male formation identical to that on the cap assembly. Below the head is an enlarged cylindrical collar 28 whose internal cavity wall 28A is threaded to engage the threaded nipple (not shown) of the hydrant port. The housing, when on the nipple, is seated against the hydrant in the same manner as a conventional cover.

Surrounding housing 26 and having a complementary formation is a Saturn ring 29, the ring being rotatable about the housing so that should one turn the ring it will not at the same time turn the housing and uncover the port. As in the case of the cap housing, Saturn ring 29 is linked to the cover housing by means of a retaining ring 30 which fits into matching annular grooves in the housing and Saturn ring.

The Saturn ring in this embodiment is provided with a circular shoulder 29A below which is a constricted neck 29B, the shoulder and neck being engageable by the claws of the special wrench which is the same as in the first embodiment. Thus one can only attach the cover assembly or remove it from the hydrant port by means of the special wrench and unauthorized operation of the hydrant is prevented thereby.

The present invention provides in either embodiment, a lock system whose smooth hardened surfaces will defeat conventional tampering tools such as hacksaws, chisels, sledge hammers and wrenches. The locking system which includes the cap assembly is easily mounted in a matter of minutes on existing fire hydrants or equivalent apparatus having operating stems and in the case of the cover assembly, the assembly simply replaces existing port covers.

While there has been shown and described preferred embodiments of tamper-proof locking systems for fire hydrants, it will be appreciated that many changes and modifications may be made therein without, however, departing from the essential spirit of the invention.

I claim:

1. A tamper-proof lock system for protecting the stem of a fire hydrant or similar apparatus against unauthorized turning thereof, said system comprising:
   A. a cap assembly mountable on said stem and including a cap housing whose head has a circular array of sloped faces formed thereon, the housing having a central inner cavity dimensioned to receive and socket said stem whereby rotation of said housing causes rotation of said stem and a Saturn ring encircling said housing and linked thereto for relative rotation, and
   B. a wrench cooperating with said cap assembly, said wrench having at least two sloped faces adapted to complement and engage corresponding faces in said array thereof on said cap housing, and a fixed claw cooperating with an adjustable claw to grip said Saturn ring to provide purchase.

2. A system as set forth in claim 1, wherein said stem has a pentagonal shape and said cavity is likewise shaped.

3. A system as set forth in claim 1, wherein said head array is composed of five major faces.

4. A system as set forth in claim 1, wherein said cap assembly Saturn ring is linked to said housing by a snap ring which is received in complementary grooves formed in said housing and said Saturn ring.

5. A system as set forth in claim 4, wherein said Saturn ring is provided with a set of radial holes to admit radially-advancing screws adapted to retract said snap ring from the groove in said Saturn ring to permit dismantling of the cap assembly.

6. A system as set forth in claim 1, wherein said cap assembly further includes a dowel pin adapted to pass through a bore in said stem, the ends of said pin projecting into a diametrical hole in said housing, whereby said pin acts to fasten said housing to said stem.

7. A system as set forth in claim 1, wherein said wrench is provided with a handle having a threaded rod entering into a threaded bore in said adjustable claw whereby rotation of said handle causes said claw to move toward or away from said fixed claw.

8. A system as set forth in claim 7, wherein said wrench has an opening with a pentagonal formation to receive stems having a similar formation.

* * * * *

UNITED STATES PATENT OFFICE
CERTIFICATE OF CORRECTION

PATENT NO. : 3,935,877

DATED : February 3, 1976

INVENTOR(S) : Peter A. Franceschi

It is certified that error appears in the above-identified patent and that said Letters Patent are hereby corrected as shown below:

Column 3, line 14 "in" should have read -- is --

Signed and Sealed this twentieth Day of April 1976

[SEAL]

Attest:

RUTH C. MASON
*Attesting Officer*

C. MARSHALL DANN
*Commissioner of Patents and Trademarks*